United States Patent
Pollmann-Retsch et al.

(10) Patent No.: US 7,654,696 B2
(45) Date of Patent: Feb. 2, 2010

(54) LIGHTING UNIT

(75) Inventors: Jens Pollmann-Retsch, Aachen (DE); Holger Mönch, Vaals (NL); Wouter Jozef Maes, Zwijndrecht (BE); Edmond Mariette Emile Verstraeten, Geel (BE)

(73) Assignee: Koninklijke Philips Electronics, N.V., Eindhoven (NL)

( * ) Notice: Subject to any disclaimer, the term of this patent is extended or adjusted under 35 U.S.C. 154(b) by 201 days.

(21) Appl. No.: 10/538,104

(22) PCT Filed: Dec. 4, 2003

(86) PCT No.: PCT/IB03/05610

§ 371 (c)(1),
(2), (4) Date: Jun. 8, 2005

(87) PCT Pub. No.: WO2004/054328

PCT Pub. Date: Jun. 24, 2004

(65) Prior Publication Data

US 2006/0158125 A1    Jul. 20, 2006

(30) Foreign Application Priority Data

Dec. 11, 2002   (EP)   .................................. 02102727

(51) Int. Cl.
*F21V 29/00*   (2006.01)

(52) U.S. Cl. .......................... 362/294; 353/52; 353/57; 315/309; 315/118

(58) Field of Classification Search .................. 315/118, 315/291, 294, 297, 307–309; 353/52, 57, 353/60; 362/294, 373
See application file for complete search history.

(56) References Cited

U.S. PATENT DOCUMENTS

| 2,177,704 | A | | 10/1939 | Francis |
| 2,196,022 | A | | 4/1940 | Moyer |
| 3,470,415 | A | | 9/1969 | Michalski ................... 315/117 |
| 4,283,658 | A | * | 8/1981 | Parker ........................ 315/117 |
| 4,533,853 | A | | 8/1985 | Hammond ................... 315/117 |
| 4,672,271 | A | | 6/1987 | Gear et al. ................... 315/117 |

(Continued)

FOREIGN PATENT DOCUMENTS

DE    10028657 A1    12/2001

(Continued)

*Primary Examiner*—Douglas W Owens
*Assistant Examiner*—Ephrem Alemu

(57) ABSTRACT

A lighting unit is described which has a discharge lamp (1), in particular a high pressure or high intensity discharge (HID) lamp or an ultra high performance (UHP) lamp, a lamp driver (2) and a cooling device (3). To reduce mechanical stresses caused by temperature variations in the lamp (1), one or more operating parameters of the lamp (1) are detected. In addition, a control unit is provided for controlling the lamp driver (2) and/or the cooling device (3) at least during switching on and/or off of the lighting unit in such a way that there is no excursion from a predetermined range of the at least one operating parameter. By selecting the parameter range suitably, the service life of the lamp may be extended considerably or the power of the lamp may be increased while the service life remains the same.

35 Claims, 2 Drawing Sheets

U.S. PATENT DOCUMENTS

Figure 1:
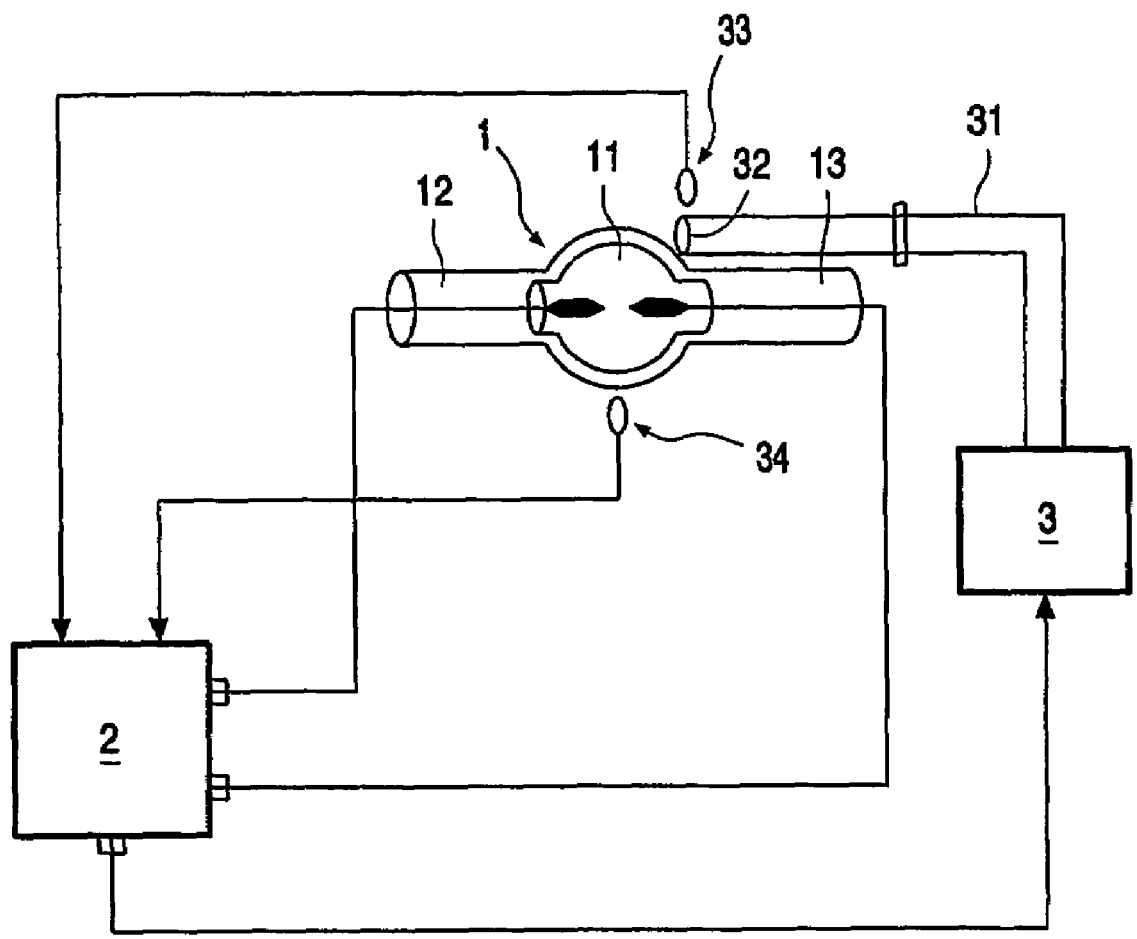

| | | | |
|---|---|---|---|
| 4,887,122 A | 12/1989 | Morikawa | 355/30 |
| 5,583,396 A | 12/1996 | Hideaki et al. | |
| 5,705,897 A | 1/1998 | Hanazaki et al. | 315/307 |
| 5,909,085 A | 6/1999 | Nelson | 315/94 |
| 5,962,990 A | 10/1999 | Kern | 315/307 |
| 6,016,031 A | 1/2000 | Lapatovich et al. | 313/493 |
| 6,398,366 B1 * | 6/2002 | Hara et al. | 353/57 |
| 6,443,575 B1 * | 9/2002 | Miyamoto et al. | 353/58 |
| 6,588,907 B1 * | 7/2003 | Billington et al. | 353/57 |
| 6,621,239 B1 * | 9/2003 | Belliveau | 315/312 |
| 6,635,999 B2 * | 10/2003 | Belliveau | 315/149 |
| 6,709,111 B2 * | 3/2004 | Hirao et al. | 353/52 |
| 6,788,009 B2 | 9/2004 | Fujii et al. | |
| 2002/0118160 A1 * | 8/2002 | Nakamura et al. | 345/101 |

FOREIGN PATENT DOCUMENTS

EP    1 017 257 A1    5/2000

* cited by examiner

LIGHTING UNIT

The present application claims priority of
PCT/IB03/05610 filed Dec. 4, 2003, of which this is the US national filing, and
EP 02102727.1 filed Dec. 11, 2002, which was the priority document for the PCT application.

The invention relates to a lighting unit having a discharge lamp, in particular a high pressure or high intensity discharge OM) lamp or an ultra high performance (UHP) lamp, a lamp driver and a cooling device. The invention also relates to a projection system having such a lighting unit.

Because of their optical properties, high intensity discharge lamps and in particular UHP lamps are used inter alia preferably for projection purposes with displays or in projection systems. It has been demonstrated that the service life of discharge lamps is determined substantially by the operating parameters, such as in particular the lamp current, the lamp power and the temperature and temperature differences in the lamp and in particular in the wall of the discharge vessel.

Of particular significance is the thermal loading of the lamp, which may vary considerably depending on its installation situation, surrounding environment and size. In order to reduce the associated risk of a reduction in service life, in the case of lamps of relatively low power excessive heating is prevented by a suitable lamp design, in particular appropriate lamp geometry. In the case of higher power lamps, an active cooling device is generally necessary.

An appropriate lamp geometry and an active cooling device for an electrodeless discharge lamp (EHID) are known, for example, from U.S. Pat. No. 6,016,031. The cooling device comprises an air pressure source and one or more nozzles, with which an air seam is directed onto the top of the lamp or evenly onto all sides. The air pressure is rated and the shapes and dimensions of the cross-sections of the nozzles are selected in such a way that the surface temperature of the lamp does not exceed a given value, which would lead to a in service life.

Account must be taken, on the one hand, of the fact that, during operation of the lamp, certain areas heat up particularly strongly and have to be cooled correspondingly strongly. On the other hand, however, the areas with the lowest temperature must not be excessively cooled, since a sufficiently high mercury vapor pressure can otherwise no longer arise in the discharge chamber. Moreover, there is a risk of the temperature differences in the wall of the discharge vessel becoming excessive and of high mechanical stresses building up, which may in turn lead to a reduction in the service life or even to destruction of the lamp.

It has also emerged that the temporal and spatial temperature gradients become greater, the higher the operating temperature or power of the lamp and the more strongly or more differently individual wall areas are cooled with an active cooling device.

This problem is particularly serious during the switching on and off phases of the lamp, since the temperature conditions in these phases change very quickly and to a considerable extent.

If, for example, the lamp is switched off, the heat-generating plasma breaks down and thus also the thermal convection current in the discharge vessel. The consequences of this are that the temperature distribution in the wall of the discharge vessel changes and the wall areas cool off to differing extents and at different rates in accordance with their varying temperatures in the operating state. In this way, considerable mechanical stresses may arise in the wall of the discharge vessel, which may lead to immediate destruction of the lamp or at least to a reduction in the service life of the lamp. This problem may also occur in like manner when the lamp is switched on.

It is therefore an object of the invention to provide a lighting unit of the above-mentioned type with which a longer service life may be achieved in particular when using high-power lamps or the lamp may be operated with increased power while maintaining the same length of service life.

A further object of the invention is to provide a lighting unit of the above-mentioned type, which eliminates at least to a considerable extent the effect associated with switching the lamp on and off of reducing the service life or destroying the lamp.

In particular, it is intended to provide a lighting unit of the above-mentioned type in which the lamp may be so operated that the mechanical stresses in the light bulb and in particular in the discharge vessel caused by temperature fluctuations are substantially less during all operating phases or at least do not reach a level at which they reduce the service life in comparison to known lighting units.

Finally, it is intended to provide a lamp driver in particular for use in a lighting unit of the above-mentioned type or in a projection system having such a lighting unit, with which lamp driver a discharge lamp and/or a cooling device may be operated in such a way, especially during switching on/off, that the service life of the lamp is extended in comparison to known lamp drivers or the lamp may be operated with increased power for the same service life.

One embodiment of the invention includes a lighting unit having a discharge lamp, a lamp driver, a cooling device, at least one device for detecting at least one predetermined operating parameter of the discharge lamp, together with a control unit for controlling the lamp driver and/or the cooling device at least during switching on and/or off of the lighting unit in such a way that there is no excursion from a predetermined range of the at least one operating parameter.

Operating parameters should be understood, in this context, to mean not only the lamp power or the lamp current, but also the temperature of the lamp and in particular the temperatures in the wall of the discharge vessel of the lamp. In addition, it has emerged that these temperatures are largely dependent on the power of an active cooling device acting on the lamp and in particular on an air or gas stream directed onto the lamp, such that, on the basis of this direct influence, the cooling power of the cooling device should also be one of the operating parameters of the lamp.

The type and range of one or more of these operating parameters, from which range there should be no excursion at least during switching on and/or off, are selected as a function of the detectability thereof and of the type of lamp used as well as with regard to whether primarily the service life of the lamp is to be extended or the lamp is to be operated with the same service life at increased power.

Other embodiments of the invention include a control unit for use with the lighting unit, a lamp driver for use with the lighting unit, and a projection system including the lighting unit. The lamp driver may be coupled with a discharge lamp and cooling device, particularly for control during switching on and/or off.

A substantial advantage of these solutions is that high mechanical stresses in the wall of the discharge vessel, which have a service life-reducing effect, may be prevented therewith during switching on and off of the lamp.

At this point it should be mentioned that it is known from DE 17 64 728 to cool a gas discharge lamp with a fan which is operated with a switching device in such a way that it is activated with a time delay after switching on of the lamp at a first, low cooling power and continues at a second, high cooling power for a given time period after the lamp has been switched off. In this way, the lamp is intended on the one hand to achieve its operating temperature as quickly as possible after switching on and on the other hand to cool down as quickly as possible after switching off, so that it may optionally be switched back on again after only a short period.

However, it has become clear that this does not allow the lamp to cool rapidly in an even enough manner to prevent considerable mechanical stresses from arising in the discharge vessel and the risk thereby arises, in particular with high intensity lamps, of a reduction in the service life of the lamp or even destruction thereof. Because of this discovery, this publication is not deemed relevant with regard to solving the problem forming the basis of the invention.

Further embodiments of the invention include optional features such as:

- A sensor (33; 34) for detecting the operating parameter in the form of the temperature of a wall of the discharge vessel (11) of the discharge lamp (1);
- One of the operating parameters of the discharge lamp (1) being the lamp current and/or the lamp power;
- The range of the at least one operating parameter being so rated that the mechanical stresses in the wall of the discharge vessel (11) of the lamp (1), caused by temperature fluctuations in the discharge lamp (1), are at least substantially reduced;
- The control unit (23) being incorporated into the lamp driver (2);
- A sensor (33), connected to the control unit (23), for detecting the power of the cooling device (3) in the form of the velocity or the pressure or the volume of a gas stream directed onto the discharge lamp (1), the lamp driver (2) and/or the cooling device (3) being controllable by the control unit (23) as a function of the output signal of the sensor (33);
- The control unit (23) including a microprocessor unit and a memory for storing at least one switching schedule according to which the lamp driver (2) and/or the cooling device (3) can be controlled; and/or
- A switching schedule activatable by an off switch of the lighting unit, according to which schedule the lamp driver (2) and the cooling device (3) can be adjusted down alternately and/or stepwise.

Figure 2:
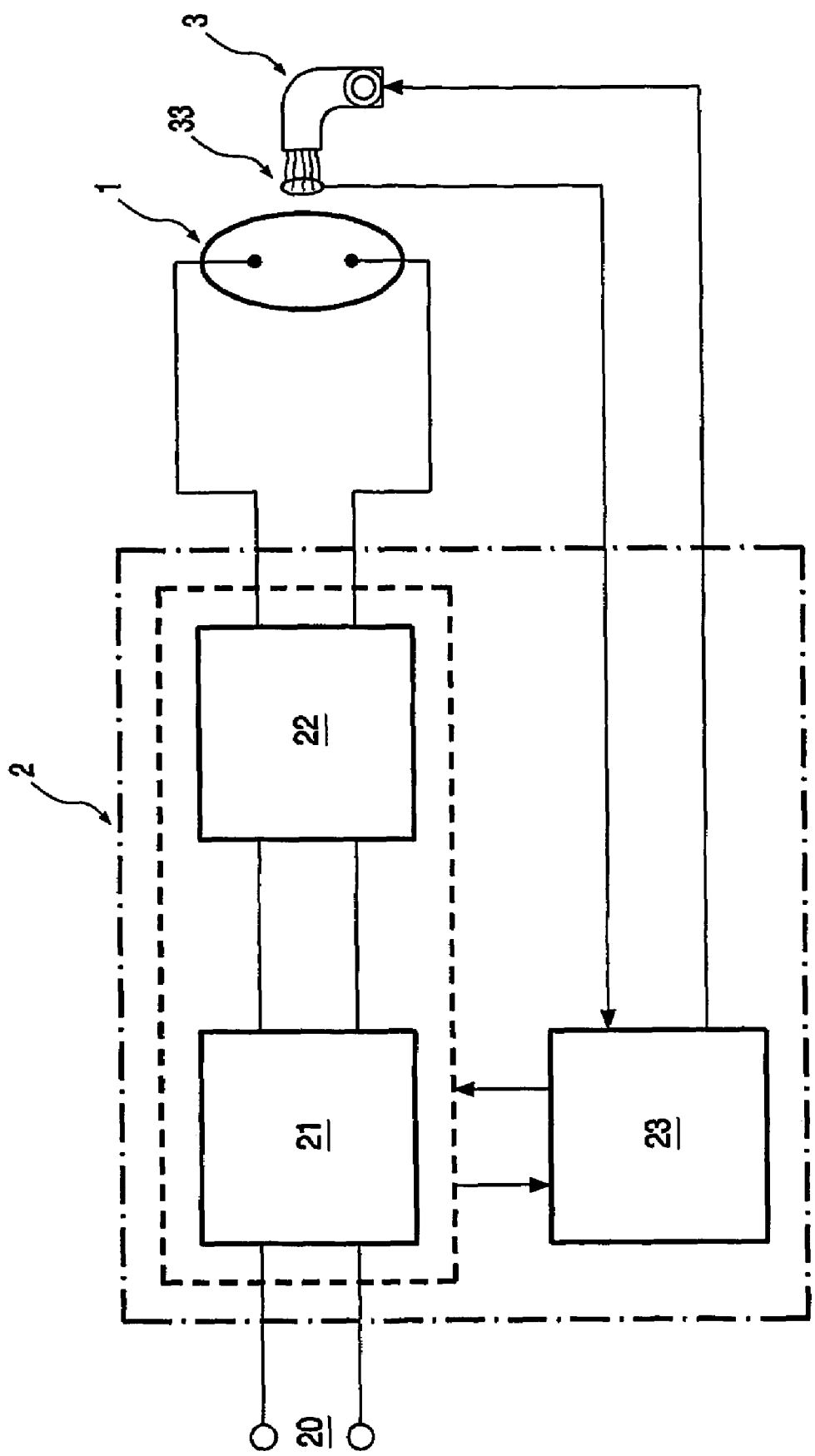

The invention will be further described with reference to examples of embodiments shown in the drawings to which, however, the invention is not restricted. In the Figures:

FIG. 1 is a schematic overall representation of a lighting unit according to the invention; and FIG. 2 is a schematic block diagram of a lamp driver with a control unit.

According to FIG. 1, the lighting unit comprises a discharge lamp 1 with a discharge vessel 1, in which there are located a discharge chamber with a discharge gas and two electrodes, between whose tips an arc discharge is induced when the lamp is in the operating state. On opposing sides, the discharge vessel 11 in each case comprises a metal-quartz bushing 12, 13 with in each case one metallic conductor connected to the electrodes as well as an electrical terminal via which the lamp voltage is supplied in known manner.

To this end, the electrical terminals of the discharge lamp 1 are connected to the electrical output terminals of a lamp driver 2. The input voltage generally takes the form of a line voltage (not illustrated) applied to the lamp driver 2. The lamp driver 2 thus serves to transform the line voltage into a lamp voltage suitable for operating the discharge lamp and makes available the current necessary therefor, when the lamp is switched on, for example by means of a switch (not shown) on the lamp driver 2.

As has already been explained, discharge lamps, in particular high power discharge lamps, have to be actively cooled during operation. This task is performed by a cooling device 3, which generally contains a gas, in particular an air, pressure source and which directs a gas or air stream onto the lamp 1, in particular the discharge vessel 11, via a pressure line 31 with a nozzle 32.

To detect the power of the cooling device 3, in particular the velocity of the gas stream leaving the nozzle 32, a first sensor 33 is provided which is connected to the lamp driver 2 for evaluation of the sensor signal. As an alternative or in addition thereto, a further sensor may also be arranged in the pressure line 31, with which sensor, for example, the volume or pressure of the gas stream conveyed to the lamp 1 is detected and transmitted to the lamp driver 2. Evaluation of one of these variables allows not only monitoring of the cooling device 3, for example with regard to a fault or a failure, but also specific control of the cooling power acting on the lamp 1, in order in this way to influence the temperature thereof and to keep it within a predetermined range.

As an alternative and/or in-addition thereto, this first sensor 33, by evaluating the sensor signal, may also allow a conclusion to be drawn with regard to the lamp temperature, since this is dependent on the cooling power acting thereon, for example in the form of the volume of the cooling air stream directed onto the lamp per unit time.

To control the cooling power, for example, the speed of rotation of a drive of a pressure pump in the cooling device 3 is varied appropriately or a shut-off valve in the pressure line 31 is opened or closed.

A second sensor 34 may be arranged on the discharge vessel 11 of the lamp 1, which sensor 34 detects the lamp temperature and in particular the temperature in the wall of the discharge vessel 11. This second sensor 34 is also connected to the lamp driver 2 for evaluation of the sensor signal. However, such a second sensor 34 directly on the lamp 1 is not generally necessary since, as explained above, the temperature thereof may be determined 30 or detected sufficiently precisely by means of the power of the cooling device. To this extent, use of the second sensor 34 is generally only necessary as an alternative to the first sensor 33.

However, a further, essential operating parameter of the lamp 1 in the form of the lamp current and/or the lamp voltage and/or the lamp power is detected by means of an appropriate device in the lamp driver 2.

An electrical connection is provided between the cooling device 3 and the lamp-driver 2 for activation of the former by the latter.

Finally, an on/off switch is generally located on the lamp driver 2, through actuation of which switch the lamp 1 may be switched on and off.

A schematic block diagram of the lamp driver 2 is shown in FIG. 2. The lamp driver 2 substantially comprises a first unit 21, with which input terminals 20 are connected for supplying an alternating line voltage. The first unit 21 comprises, for example, a rectifier with downstream down converter and serves to generate a controlled direct voltage from the alternating line voltage.

The output of the first unit 21 is connected to a second unit 22, which comprises a commutator (for example in the form of a full bridge circuit) and with which the current waveform necessary for lamp operation is generated from the direct voltage supplied. The output of the second unit 22 is connected to the lamp 1. The first and second units 21, 22 together thus form a trigger circuit for the lamp 1.

The lamp driver 2 further comprises a control unit 23, to the first input of which the output signal of the first sensor 33 is applied. The control unit 23 comprises a second input, which is connected to the trigger circuit 21, 22 and via which the control unit 23 detects the lamp current and/or the lamp voltage and/or the lamp power. A first output of the control unit 23 is connected to the trigger circuit 21, 22, a second output of the control unit 23 is applied to the cooling device 3 for activation thereof.

The control unit 23 preferably takes the form of a microprocessor unit. As a function of the information supplied via the two inputs about the operating parameters of the lamp 1 (power of the cooling device 3 and lamp current and/or lamp voltage and/or lamp power) and as a function of the switch position of the on/off switch for the lamp 1, the output power of the lamp 1 (or the lamp current) and/or the power of the cooling device 3 may be controlled in accordance with various control or switching schedules.

On the one hand, it is thereby ensured that the lamp 1 is always cooled sufficiently during routine operation, for example by controlling the cooling power of the cooling device 3 as a function of the lamp temperature detected indirectly with the first sensor 33 or directly with the second sensor 34.

If, in the case of unfavorable operating and/or environmental conditions, the cooling power is insufficient (or the cooling device 3 operates defectively or fails) and thus the temperature of the lamp 1 exceeds a given maximum permissible, preset value, the lamp current may be automatically reduced or switched off by means of the lamp driver 2 to prevent damage or destruction.

On the other hand, it is possible, even during switching on and/or off, for the lamp 1 and/or the cooling device 3 to be switched on or off and operated automatically, for example stepwise, in coordinated manner in such a way that the above-described mechanical stresses in the lamp 1 and in particular in the discharge vessel 11 are substantially less or do not exceed a predeterminable value.

To this end, the following operating parameters of the lamp 1 should be evaluated cyclically by the control unit 23 of the lamp driver 2:

The instantaneous temperature of the lamp 1 or the wall of the discharge vessel 11 is detected by evaluating the output signal of the second sensor 34.

As an alternative or in addition thereto, the cooling power to which the lamp 1 is exposed by the cooling device 2, and thus, as explained above, indirectly (also) the temperature of the lamp 1, may be detected by means of the first sensor 33 and/or the pressure sensor present in the pressure line 31.

Furthermore, the lamp current and/or the lamp voltage and/or the lamp power are scanned by appropriate sensor means in the control unit 23.

Various switching schedules may be produced with these variables during switching on and off:

In the simplest case, with a first switching schedule both the lamp 1 and the cooling device 3 are switched on and/or off directly by actuation of the on/off switch. This may be sensible if, for example, the lamp 1 is so dimensioned that the mechanical stresses arising are low and no damage to the lamp is to be feared, or if it is important that the cooling device 3 does not make any noise after the lamp 1 has been switched off.

With a second switching schedule, the lamp 1 is again switched off directly by actuation of the off switch, but the cooling device 3 remains active for a predetermined period of time. In this way, the lamp 1 is cooled down particularly quickly and may be switched on again after only a relatively short interval.

With a third switching schedule, the cooling device 3 is switched off directly by actuation of the off switch, while the lamp 1 remains active for a predetermined period of time. This ensures that mechanical stresses which have built up in the lamp 1 and in particular in the wall of the discharge vessel 11 during operating phases at reduced operating temperature are reduced by annealing at elevated temperature.

In a fourth switching schedule, the lamp 1 and the cooling device 3 are reduced in power alternately and/or stepwise when the off switch is actuated. This may be achieved, for example, in that the power of the cooling device 3 is adjusted as a function of the current supplied instantaneously to the lamp 1 (or the lamp power) and/or the lamp current (or the lamp power) is adjusted as a function of the instantaneous power of the cooling device 3.

Furthermore, the lamp power and the power of the cooling device 3 are also reduced stepwise in such a way that the lamp 1 is operated ultimately at reduced power without the cooling device 3, in order thereby to eliminate mechanical stresses in the lamp in accordance with the third switching schedule by annealing at elevated temperature.

In a fifth switching schedule, actuation of the off switch effects immediate switching off of the lamp 1 and an increase in cooling power for a predetermined period of time after switching off of the lamp 1. The particularly rapid cooling effected thereby makes it possible to switch the lamp back on after a short period, as with the second switching schedule. Furthermore, with this switching schedule, mechanical stresses in the lamp 1 or in the wall of the discharge vessel 11 may be generated in a controlled manner, for example in order thereby to counter or compensate for mechanical stresses arising due to the uneven heating when the lamp is switched on. In such a case, overall only substantially lower mechanical stresses arise when the lamp is next switched on.

Comparative tests using the above-mentioned switching schedules have demonstrated that very different mechanical stress distributions may thereby be produced in the wall of the discharge vessel 11.

If, conversely, a given mechanical stress distribution is to be achieved or not exceeded, the numerical values of the above-mentioned switching schedules should be selected as a function of the operating parameters of the lamp 1 used and the power of the cooling device 3 together, for example, with the required explosion protection and service life of the lamp 1, the time available for switching on and off and the noise level tolerable with regard to use of the lighting unit.

Examples of the numerical values for the fourth switching schedule are given below. It should be assumed that the discharge lamp is cooled during operation with an air stream of approx. 2.9 liters per minute (1/min) and operated at a power of 450 watts.

If the moment at which a user moves the switch on the lamp driver 2 into the off position is designated time 0, the lamp power and the power of the cooling device are reduced as follows at this time and after the subsequent intervals (Table 1):

TABLE 1

| 0 sec.   | 400 watts | 2.5 l/min |
|----------|-----------|-----------|
| 30 sec.  |           | 2.2 l/min |
| 60 sec.  | 360 watts |           |
| 90 sec.  |           | 1.9 l/min |
| 120 sec. | 320 watts |           |

TABLE 1-continued

| | | |
|---|---|---|
| 150 sec. | | 1.7 l/min |
| 180 sec. | 280 watts | |
| 210 sec. | | 1.5 l/min |
| 240 sec. | 240 watts | |
| 270 sec. | | 1.3 l/min |
| 300 sec. | 0 watts | 0 l/min |

This Table is preferably stored in the control unit 23, in particular the microprocessor unit, present in the lamp driver 2, such that the control unit 23 regulates the power of the lamp 1 and the cooling device 3 in the manner described.

It is clear from the Table that every 30 seconds from actuation of the switch the lamp power or the power of the cooling device 3 is reduced, while the respective other variable remains unaltered. It has been demonstrated that the lamp temperature and in particular the temperature of the discharge vessel 11 may thereby be reduced in a highly controlled manner and without great fluctuations over the entire switching-off phase.

It has also been demonstrated that, after the end of the switching-off phase, i.e. after five minutes, while the maximum temperature of the lamp 1 has only been reduced slightly, the level of the temperature gradients in the wall of the discharge vessel 11 has reduced considerably. This has the direct result that the mechanical stresses are accordingly also slight. Further tests have shown that this effect is achieved to a particularly great extent at high lamp powers.

The invention claimed is:

1. An automated method for preventing mechanical stress to a discharge vessel of a discharge lamp, the method comprising using a control device to effectuate operations in a lamp, the operations comprising:
   receiving an actuation indication for switching off of the lamp; and
   responsive to the actuation indication, providing control signals to coordinate cooling and power to the lamp, the control signals specifying a first predefined plurality of stepwise intermediate values for cooling between full on and full off; and a second predefined plurality of stepwise intermediate values for lamp driver power between full on and full off.

2. The method of claim 1, wherein the control signals are provided based on a plurality of timings relative to the actuation indication, each timing being associated with at least one of the first and second plurality of stepwise intermediate values.

3. The method of claim 1 wherein the control signals are responsive to at least one stored switching schedule.

4. The method of claim 1, wherein the control signals for coordinating cooling power to the lamp are provided responsive to stored timing values.

5. A control unit for controlling a lamp driver and a cooling device for a discharge lamp, comprising:
   a memory that is configured to store a switching schedule that includes a first plurality of stepwise intermediate values for cooling between full on and full off; and a second plurality of stepwise intermediate values for lamp driver power between full on and full off, and
   a processor that is configured to:
   receive an actuation indication for switching off of the lamp; and
   responsive to the actuation indication, providing control signals to coordinate cooling and power to the lamp according to the switching schedule.

6. The control unit of claim 5, wherein the processor is configured to control power of the cooling device as a function of current supplied instantaneously to the lamp or as a function of power of the lamp driver.

7. The control unit of claim 5, wherein the switching schedule includes reducing power of the lamp and power of the cooling device stepwise unit the cooling is switched off before the lamp is switched off.

8. The control unit of claim 5, including:
   a first input for detecting a parameter of a cooling device, which cooling device acts on the lamp, and
   a second input for detecting a lamp driver control parameter, and
   wherein the processor provides other control signals to the cooling device and a lamp driver based on the first and second inputs in such a way that there is no excursion from a predetermined range of the lamp temperature during a given time interval.

9. The control unit of claim 5, including a lamp driver.

10. A lamp driver for driving a discharge lamp and a cooling device for the discharge lamp, which lamp driver comprises at least the control unit according to claim 5.

11. The control unit of claim 5, wherein the switching schedule includes alternating steps of values for power to the lamp and power to the cooling device.

12. The control unit of claim 5, wherein the memory includes an other switching schedule for switching on the lamp.

13. An assembly comprising the control unit of claim 5 and a lamp driver, the lamp driver being internal or external to the control unit and comprising a trigger circuit for operating the discharge lamp, wherein the control unit controls the trigger circuit and the cooling device via a first and a second output, respectively.

14. An assembly of claim 13, wherein the control unit detects the lamp current and/or the lamp voltage and/or the lamp power via the trigger circuit, which is connected with the second input of the control unit.

15. A lighting unit comprising a discharge lamp, the assembly of claim 13; and the cooling device.

16. A lighting unit comprising:
   a discharge lamp,
   a lamp driver that is configured to provide power to the discharge lamp,
   a cooling device that is configured to cool the discharge lamp,
   a first sensor for detecting an output of the cooling device,
   a second sensor for detecting a lamp temperature, and
   a control unit that is configured to control at least one of the lamp driver and the cooling device responsive to singals of the first sensor and the second sensor in such a way that there is no excursion from a predetermined range of the lamp temperature during a timing interval subsequent to actuation of the lighting unit.

17. The lighting unit of claim 16, wherein the second sensor is arranged on a discharge vessel of the lamp for detecting the temperature of a wall of the discharge vessel.

18. A projection system comprising at least the lighting unit according to 16.

19. The lighting unit of claim 16, wherein the first sensor is provided for detecting a property of an air flow produced by the cooling device.

20. The lighting unit of claim 19, wherein the property is at least one of pressure, volume, and velocity.

21. A control unit for controlling a lamp driver and a cooling device for a discharge lamp at least during switching off of the lamp in such way that the power of the lamp and the power of the cooling device are stepwise reduced over a plurality of steps of intermediate power levels for each of the lamp and the cooling device.

22. The control unit of claim 21, comprising a microprocessor unit and a memory for storing at least one switching schedule according to which the power of the lamp and the power of the cooling device are stepwise reduced.

23. The control unit of claim 21, which is provided for adjusting the power of the cooling device as a function of the current supplied instantaneously to the lamp or as a function of the lamp power, and/or adjusting the lamp current or the lamp power as a function of the instantaneous power of the cooling device.

24. The control unit of claim 21, which is provided for reducing the power of the lamp and the power of the cooling device stepwise in such a way that the cooling power is ultimately switched off before the lamp is switched off.

25. The control unit as claimed in of claim 21, comprising:
a first input for detecting a cooling power of the cooling device, which cooling power acts on the lamp, and
a second input for detecting a lamp current and/or a lamp voltage and/or a lamp power,
wherein an output power of the lamp or the lamp current and/or the cooling power of the cooling device can be controlled as a function of the information supplied via the first and the second input at least during switching off of the lamp in such a way that there is no excursion from a predetermined range of the lamp temperature.

26. A lamp driver for driving a discharge lamp and a cooling device for the discharge lamp, which lamp driver comprises at least the control unit according to claim 21.

27. The control unit of claim 21, wherein the power to the cooling device is first reduced, before the power to the lamp is reduced.

28. The control unit of claim 21, wherein the power to the cooling device is reduced to zero before the power to the lamp is reduced to zero.

29. The control unit of claim 21, wherein the power to the cooling device is reduced based on a measure of air flow from the cooling device.

30. The control unit of claim 21, wherein the power to the cooling device is reduced based on a measure of temperature of the lamp.

31. The control unit of claim 21, wherein the power to the lamp is reduced based on a measure of temperature of the lamp.

32. A method for embodiment in a lighting system that includes a lamp and a cooling device, comprising:
providing a first level of lamp power to the lamp and a first level of cooling power to the cooling device during operation of the lamp,
sensing an indication of switching off the lamp,
reducing the cooling power below the first level of cooling power while maintaining the lamp power at or above the first level of lamp power for a first time period, and
reducing the lamp power below the first level of lamp power after the first time period.

33. The method of claim 32, wherein the first time period is predefined.

34. The method of claim 32, wherein the first time period is based on a measure related to a temperature of the lamp.

35. The method of claim 34, wherein the measure is based on a detected air flow from the cooling device.

* * * * *